United States Patent
Wardin et al.

(10) Patent No.: US 7,149,292 B2
(45) Date of Patent: *Dec. 12, 2006

(54) SYSTEM AND METHOD FOR CREATING A BILLING RECORD WITH A CALLED PARTY'S NAME

(75) Inventors: William Konrad Wardin, Barrington, IL (US); Melanie Louise Murphy, Oak Park, IL (US)

(73) Assignee: SBC Holdings Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/880,966

(22) Filed: Jun. 29, 2004

(65) Prior Publication Data

US 2005/0013422 A1  Jan. 20, 2005

Related U.S. Application Data

(63) Continuation of application No. 10/222,955, filed on Aug. 15, 2002, now Pat. No. 6,868,147, which is a continuation of application No. 09/148,935, filed on Sep. 4, 1998, now Pat. No. 6,459,779.

(51) Int. Cl.
*H04M 15/00* (2006.01)
*H04M 11/00* (2006.01)

(52) U.S. Cl. ............................ 379/114.03; 379/112.01; 379/116; 379/119; 379/121.05; 379/126; 455/406

(58) Field of Classification Search ........... 379/112.01, 379/114.03, 114.05, 114.28, 116, 119, 121.04, 379/121.05, 126, 127.01; 455/405, 406, 455/407, 408
See application file for complete search history.

(56) References Cited

U.S. PATENT DOCUMENTS

| | | | |
|---|---|---|---|
| 3,995,117 A | 11/1976 | Fallon et al. |
| 4,653,086 A | 3/1987 | Laube |
| 4,794,634 A | 12/1988 | Torihata et al. |
| 4,911,536 A | 3/1990 | Ditzik |
| 4,969,180 A | 11/1990 | Watterson et al. |
| 4,979,207 A | 12/1990 | Baum et al. |
| 5,003,584 A | 3/1991 | Benyacar et al. |
| 5,157,717 A | 10/1992 | Hitchcock |

(Continued)

OTHER PUBLICATIONS

"Customer Telephone Billing" http://public.sma.gov.au/support/pubs/consumer/reports/CstTeBil.htm (May 1997).

*Primary Examiner*—Quoc Tran
(74) *Attorney, Agent, or Firm*—Brinks Hofer Gilson & Lione

(57) ABSTRACT

A method and system are provided for creating a billing record with a called party's name. Providing the called party's name on the billing record facilitates the calling party's review of the billing record by reducing the amount of time and effort needed to determine the identity of the called parties. In addition to identifying fraudulent and misbilled calls, the called party's name allows a person reviewing the billing record to quickly identify long distance calls, quickly discern business from personal calls, and audit calls made from phone lines with multiple users (e.g., employees or kids). Additionally, the billing record reviewer saves time and money by avoiding the need to call directory assistance or a billing service to identify the calls.

12 Claims, 7 Drawing Sheets

U.S. PATENT DOCUMENTS

| | | |
|---|---|---|
| 5,168,553 A | 12/1992 | Okazaki et al. |
| 5,218,632 A | 6/1993 | Cool |
| 5,249,220 A | 9/1993 | Moskowitz et al. |
| RE34,476 E | 12/1993 | Norwood |
| 5,276,794 A | 1/1994 | Lamb, Jr. |
| 5,301,222 A | 4/1994 | Fujiwara |
| 5,303,312 A | 4/1994 | Comerford et al. |
| 5,381,467 A | 1/1995 | Rosinski et al. |
| 5,392,447 A | 2/1995 | Schlack et al. |
| 5,394,463 A | 2/1995 | Fischell et al. |
| 5,481,603 A | 1/1996 | Gutierrez et al. |
| 5,486,847 A | 1/1996 | Ranf et al. |
| 5,506,893 A | 4/1996 | Buscher et al. |
| 5,508,713 A | 4/1996 | Okouchi |
| 5,519,769 A | 5/1996 | Weinberger et al. |
| 5,521,986 A | 5/1996 | Curtin, II et al. |
| 5,546,538 A | 8/1996 | Cobbley et al. |
| 5,561,446 A | 10/1996 | Montlick |
| 5,594,787 A | 1/1997 | Ohshima et al. |
| 5,623,559 A | 4/1997 | Okouchi |
| 5,644,628 A | 7/1997 | Schwarzer et al. |
| 5,655,013 A | 8/1997 | Gainsboro |
| 5,684,873 A | 11/1997 | Tilikainen |
| 5,692,037 A | 11/1997 | Friend |
| 5,734,706 A | 3/1998 | Windsor et al. |
| 5,751,693 A | 5/1998 | Dinkins |
| 5,774,531 A | 6/1998 | Johnson |
| 5,790,643 A | 8/1998 | Gordon et al. |
| 5,799,073 A | 8/1998 | Fleischer, III et al. |
| 5,842,174 A | 11/1998 | Yanor |
| 5,912,954 A | 6/1999 | Whited et al. |
| 5,920,613 A | 7/1999 | Alcott et al. |
| 5,937,044 A | 8/1999 | Kim |
| 5,940,484 A | 8/1999 | DeFazio et al. |
| 5,943,406 A | 8/1999 | Leta et al. |
| 5,982,864 A | 11/1999 | Jagadish et al. |
| 6,115,458 A | 9/2000 | Tasket |
| 6,343,120 B1 | 1/2002 | Rhodes |
| 6,459,779 B1 | 10/2002 | Wardin et al. |
| 6,868,147 B1 * | 3/2005 | Wardin et al. .......... 379/112.01 |

* cited by examiner

| XYZ Local Service | | | | | | | |
|---|---|---|---|---|---|---|---|

Local Toll

| No. | Date | Time | Place Called | Number | Code | Min | |
|---|---|---|---|---|---|---|---|
| 1 | 5-30 | 1255A | MUNCIE IN LEE'S PAINT | 765 555-4500 | N | 2 | .15 |
| 2 | 6-01 | 508P | CICERO IN PEARSON, D | 317 555-9508 | E | 7 | .92 |
| 3 | 6-01 | 658p | MUNCIE IN KOHL,K | 765 555-7500 | E | 1 | .16 |
| 4 | 6-02 | 1131P | MUNCIE IN KOHL,K | 765 555-7500 | N | 19 | 2.69 |
| 5 | 6-03 | 852A | MUNCIE IN JOHNSON,R | 765 555-5200 | O | 1 | .20 |
| 6 | 6-03 | 209P | MUNCIE IN LEE'S PAINT | 765 555-4500 | O | 11 | 1.98 |
| 7 | 6-03 | 223P | CANTON IN NOVACK, T | 317 555-9501 | D | 45 | 5.04 |
| 8 | 6-07 | 735P | FAIRLAND IN JACOBSEN,P | 765 555-1551 | E | 18 | 2.90 |
| 9 | 6-08 | 912P | MUNCIE IN | 765 555-5200 | N | 16 | 2.18 |

Total Local Toll          16.22

Long Distance

| No. | Date | Time | Place Called | Number | Code | Min | |
|---|---|---|---|---|---|---|---|
| SMITH CLGE | | | | | | | |
| 1 | 5-30 | 1255A | GREEN BAY WI | 414 555-4500 | N | 2 | .15 |
| 2 | 6-03 | 209P | GREEN BAY WI | 414 555-4500 | D | 11 | 1.98 |
| 3 | 6-07 | 735P | GREEN BAY WI | 414 555-4500 | E | 18 | 2.90 |
| Total Calls to SMITH CLGE | | | | | | | 5.03 |
| PEARSON,D | | | | | | | |
| 4 | 6-01 | 508P | ST PAUL MN | 612 555-8505 | E | 7 | .92 |
| 5 | 6-01 | 658P | ST PAUL MN | 612 555 9508 | E | 1 | .18 |
| Total Calls to PEARSON,D. | | | | | | | 1.08 |
| KOHL, K | | | | | | | |
| 6 | 6-02 | 1131P | AKRON OH | 440 555-7500 | N | 19 | 2.69 |
| 7 | 6-03 | 223P | AKRON OH | 440 555-7500 | D | 45 | 5.04 |
| Total for Calls to KOHL, K. | | | | | | | 7.73 |
| JOHNSON, R. | | | | | | | |
| 8 | 6-03 | 852P | DULUTH MN | 218 555-5200 | D | 1 | .20 |
| 9 | 6-08 | 912P | DULUTH MN | 218 555-5200 | N | 16 | 2.18 |
| Total for Calls to JOHNSON, R. | | | | | | | 2.38 |

Total Long Distance          16.22

SYSTEM AND METHOD FOR CREATING A BILLING RECORD WITH A CALLED PARTY'S NAME

CROSS-REFERENCE TO RELATED APPLICATIONS

This application is a continuation of application Ser. No. 10/222,955, filed Aug. 15, 2002 now U.S. Pat. No. 6,868,147, which is a continuation of application Ser. No. 09/148,935, filled Sep. 4, 1998 (now U.S. Pat. No. 6,459,779), each of which is hereby incorporated by reference herein.

TECHNICAL FIELD

The present invention relates generally to the creation of billing records and specifically to a system and method for creating a billing record with a called party's name.

BACKGROUND

Billing records (i.e., telephone bills) often provide the geographic location and telephone number of a person called by a calling party ("a called party"). Because it can be difficult to determine the identity of the called party based on geographic location and telephone number alone, the calling party often resorts to the time-consuming task of contacting directory assistance or his billing service to identify the calls. Determining the identity of the called party based on geographic location and telephone number is made even more difficult when a called party subscribes to a number portability service, which allows a called party to retain the same telephone number even when he moves to a different geographic location. With such a service, the area code listed on the billing record may not correspond with the geographic location listed on the billing record.

There is, therefore, a need for an improved billing system and method that will overcome the disadvantages discussed above.

BRIEF DESCRIPTION OF THE DRAWINGS

FIG. 1 is an illustration of a presently preferred printed billing record showing the names of called parties.

DETAILED DESCRIPTION OF THE PRESENTLY PREFERRED EMBODIMENTS

By way of introduction, the preferred embodiments described below include a system and method for creating a billing record, such as the billing record 100 shown in FIG. 1, with a called party's name. Providing the called party's name on the billing record facilitates the calling party's review of the billing record by reducing the amount of time and effort needed to determine the identity of the called parties. In addition to identifying fraudulent and misbilled calls, the called party's name allows a person reviewing the billing record to quickly identify long distance calls, quickly discern business from personal calls, and audit calls made from phone lines with multiple users (e.g., employees or kids). Additionally, the billing record reviewer saves time and money by avoiding the need to call directory assistance or a billing service to identify the calls.

Figure 2:
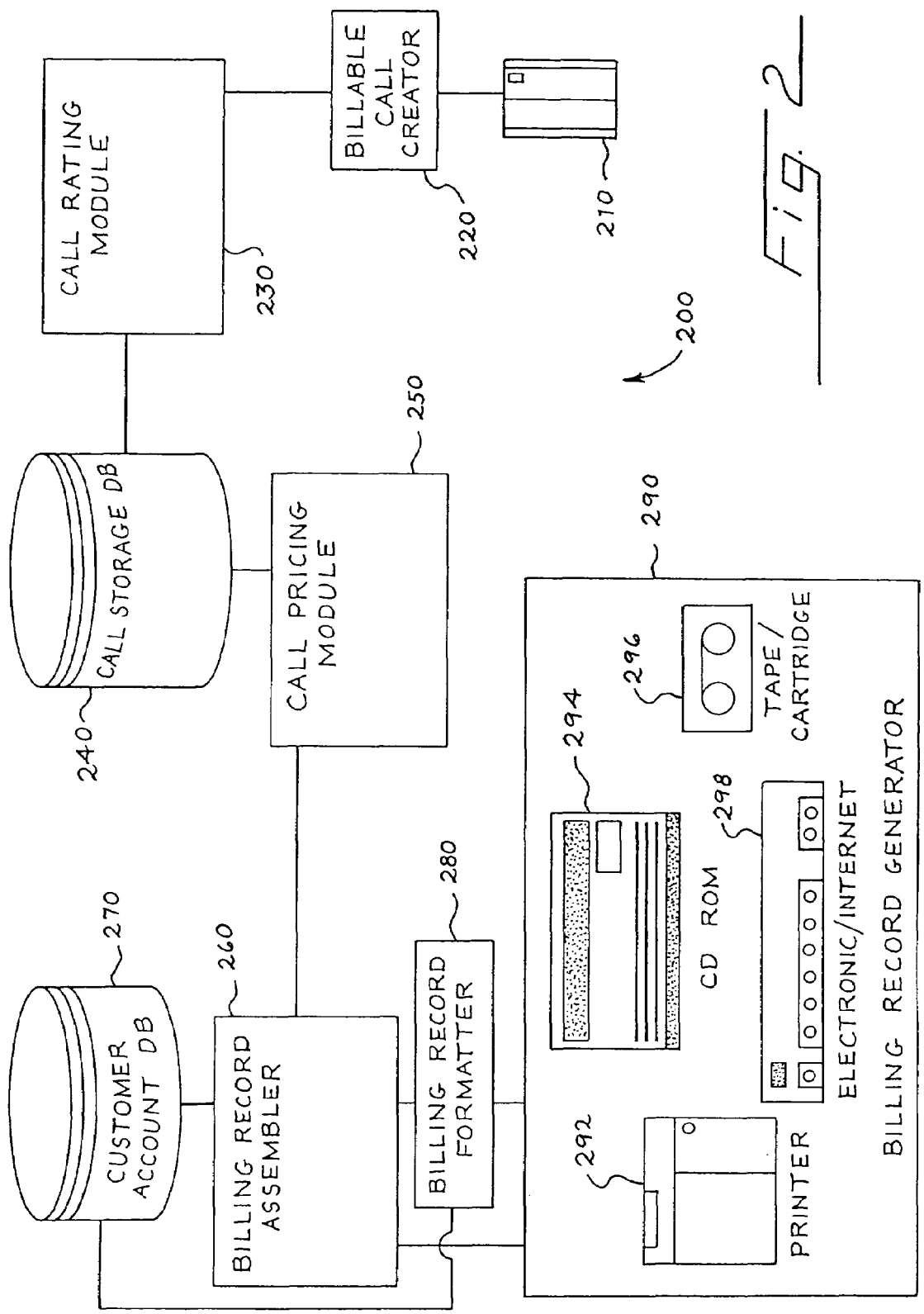
FIG. 2 is a block diagram of a billing record generation system of a presently preferred embodiment

Turning again to the drawings, FIG. 2 is a block diagram of a billing record generation system 200 of a presently preferred embodiment. As shown in. FIG. 2, this system 200 comprises a public switch 210, a billable call creator 220, a call rating module 230, a call storage database 240, a call pricing module 250, a billing record assembler 260, a customer account database 270, a billing record formatter 280, and a billing record generator 290. The billing record generator 290 can comprise, for example, a printer 292, a CD-ROM drive 294, a tape/cartridge deck 296, and/or a data network interface 298.

In operation, the public switch 210 (i.e., the telephone network) delivers a call record detailing the calls associated with the public switch 210 to a billing system. This is done after call processing, after the call is complete, and during the billing process in the billing system. The first component of the billing system is the billable call creator 220, which edits the call record to remove those call that will not be billed. For example, the billable call creator 220 can remove information about calls that were attempted but not terminated. The edited call record is then sent to the call rating module 230, which rates the calls and includes the rating information in the call record. The call record is then stored in the call storage database 240. It is preferred that the call record be provided by the public switch 210 and edited, rated, and stored on a daily basis.

At a given time, call records for individual calling parties are extracted from the call storage database 240, and the calls are priced by the call pricing module 250. Preferably, this takes place at the end of the billing period (e.g., at the end of a month) in order to apply volume discounts that are calculated at the end of the billing period. The call record is then sent from the call pricing module 250 to the billing record assembler 260, which combines the call record with information from the customer account database 270 to assemble a billing record for the calling party. The information from the customer account database 270 can include, for example, recurring monthly charges, non-recurring charges, credits, adjustments, current balance, previous balance, payments, and usage.

After the billing record is assembled, the billing record formatter 280 places the assembled billing record into a format specified by the customer account database 270. For example, the customer account database 270 can instruct the billing record formatter 280 to sort the calls in a particular order and to generate the billing record in an electronic or hard-copy form. The formatted billing record is then sent to the billing record generator 290, which prints a hard copy of the billing record using the printer 292. In addition to or as an alternative to a printed billing record, an electronic copy of the billing record can be provided to the calling party with, for example, the CD-ROM drive 294, the tape/cartridge deck 296, and/or the data network interface 298.

Figure 3:
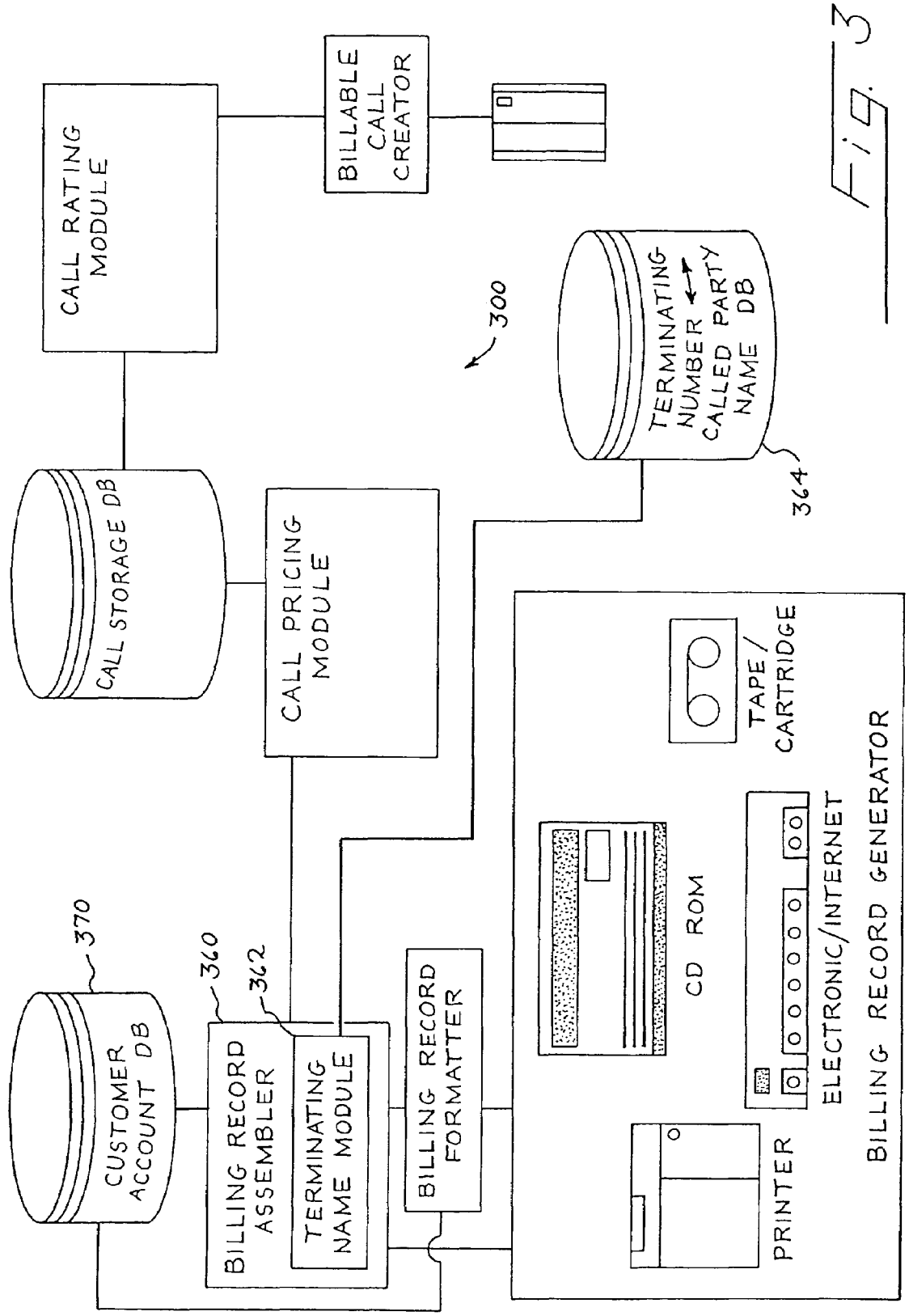
FIG. 3 is a block diagram of a system of a preferred embodiment for creating a billing record with a called party's name.

FIG. 3 is a block diagram of a system 300 of a preferred embodiment for creating a billing record with a called party's name. This system 300 is identical to the system 200 of FIG. 2 but further includes a terminating name module 362 coupled with a terminating-number-to-called-party's-name database 364. Preferably, the terminating-number-to-called-party's-name database 364 comprises a national and/or international directory assistance database. As used herein, the term "coupled with" means directly coupled with or indirectly coupled with through one or more components. As described in more detail below, the terminating name module 362 can extract a terminating number from the call record. In this preferred embodiment, the terminating name module 362 is part of the billing record assembler 360. If a calling party subscribes to the called-party's-name-on-bill service, the customer account database 370 sends a trigger to the terminating name module 362 in the billing record assembler 360 to determine the name of the called party associated the terminating number.

Figure 4:
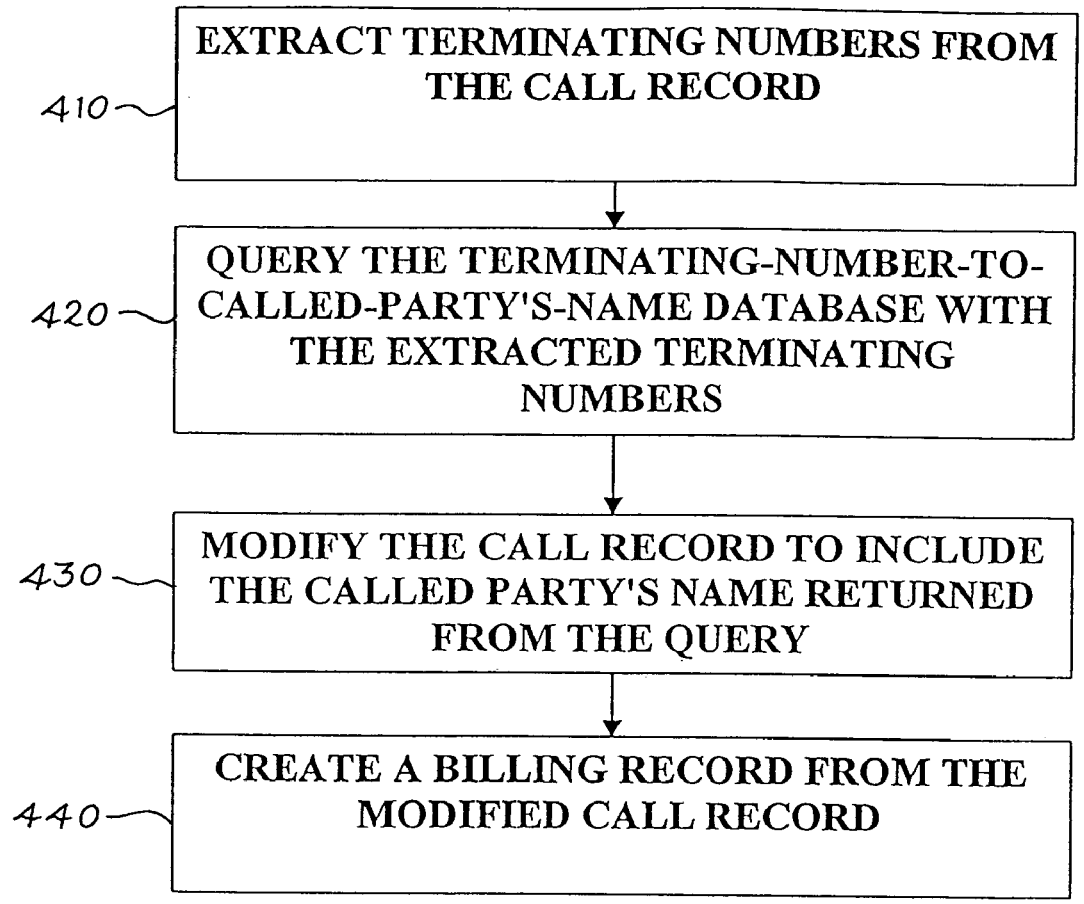
FIG. 4 is a flow chart of a preferred method of creating a billing record with a called party's name using the preferred system of FIG. 3.

FIG. 4 is a flow chart of a preferred method of creating a billing record with a called party's name using the preferred system 300 of FIG. 3. As is apparent from the foregoing description, this method preferably takes places after a call is complete. First, the terminating name module 362 extracts terminating numbers from the call record (step 410). The terminating name module 362 can then determine which of the terminating numbers, if any, are eligible for the called-party's-name-on-bill service, as described below. Next, the terminating name module 362 queries the terminating-number-to-called-party's-name database 364 with the extracted terminating numbers to perform a reverse directory-assistance look-up (step 420). It is preferred that the terminating name module 362 sort the extracted terminating numbers to query only one instance of a given terminating number. The terminating name module 362 then modifies the call record to include the called party's name returned from the query (step 430). If the extracted terminating numbers were sorted so only one query per instance of a given terminating number was sent, it is preferred that the returned called party name be added to every occurrence of the terminating number in the call record. The modified call record is then passed to the other parts of the billing system, where a hard or electronic copy of the billing record can eventually be generated (step 440).

If the terminating-number-to-called-party's-name database 364 that is coupled with the terminating name module 362 does not contain the called party's name, the terminating name module 362 ("the first terminating name module") can transfer the query to another terminating name module ("the second terminating name module") coupled with a database that does contain the information. In this situation, it is preferred that the first terminating name module place the terminating number in a message format in accordance with the Electronic Directory Assistance ("EDA") Standard Interface Specification Version 1.1, dated Oct. 16, 1997 and send the message to the second terminating name module. The second terminating name module then converts the EDA protocol into the protocol required by the database and performs the query. After the database returns a response to the query, the second terminating name module converts the database protocol back into the EDA protocol and sends the response to the first terminating name module, which extracts the called party's name from the EDA protocol and modifies the call record, as described above.

Figure 5:
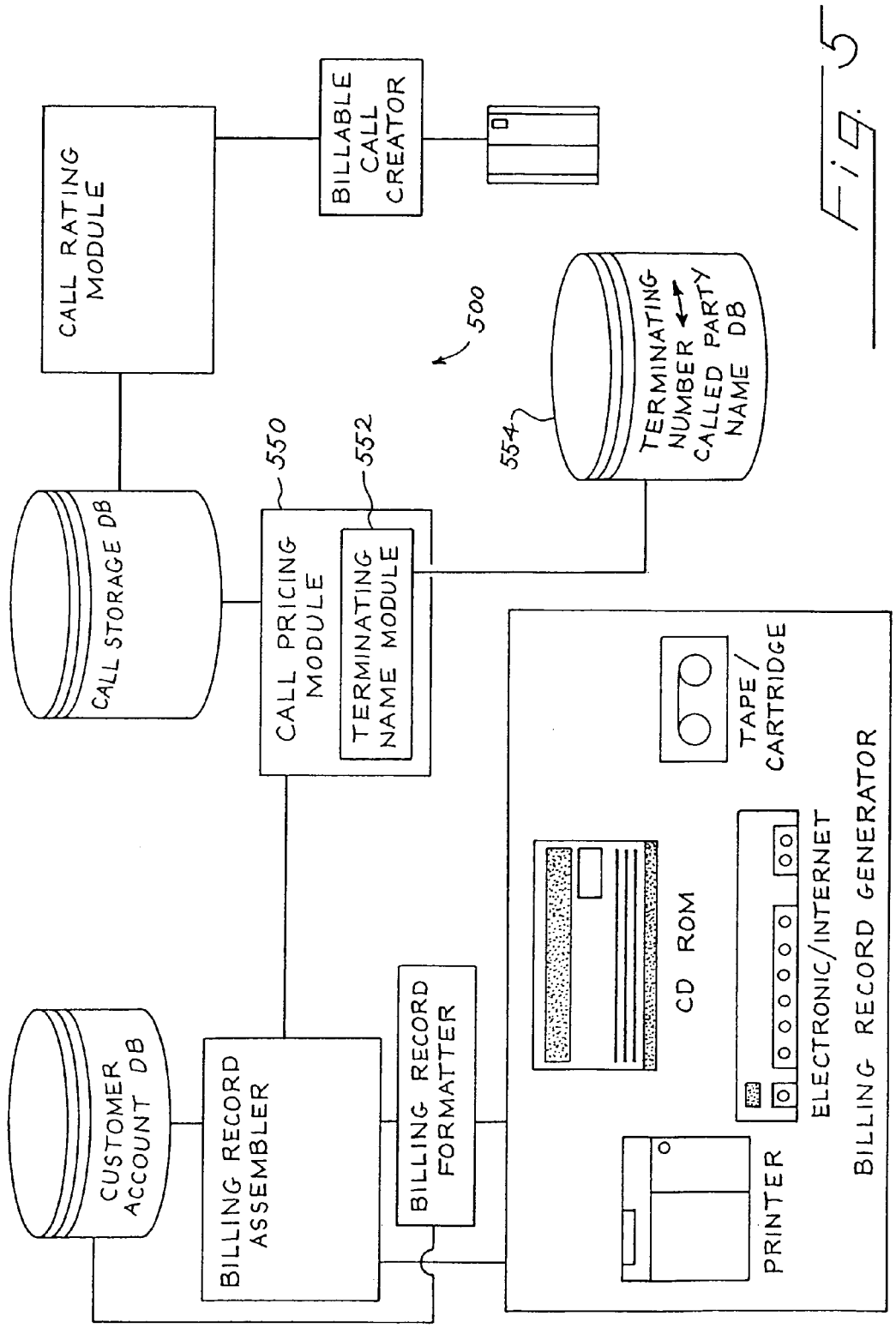
FIG. 5 is a block diagram of system of another preferred embodiment for creating a billing record with a called party's name.
Figure 6:
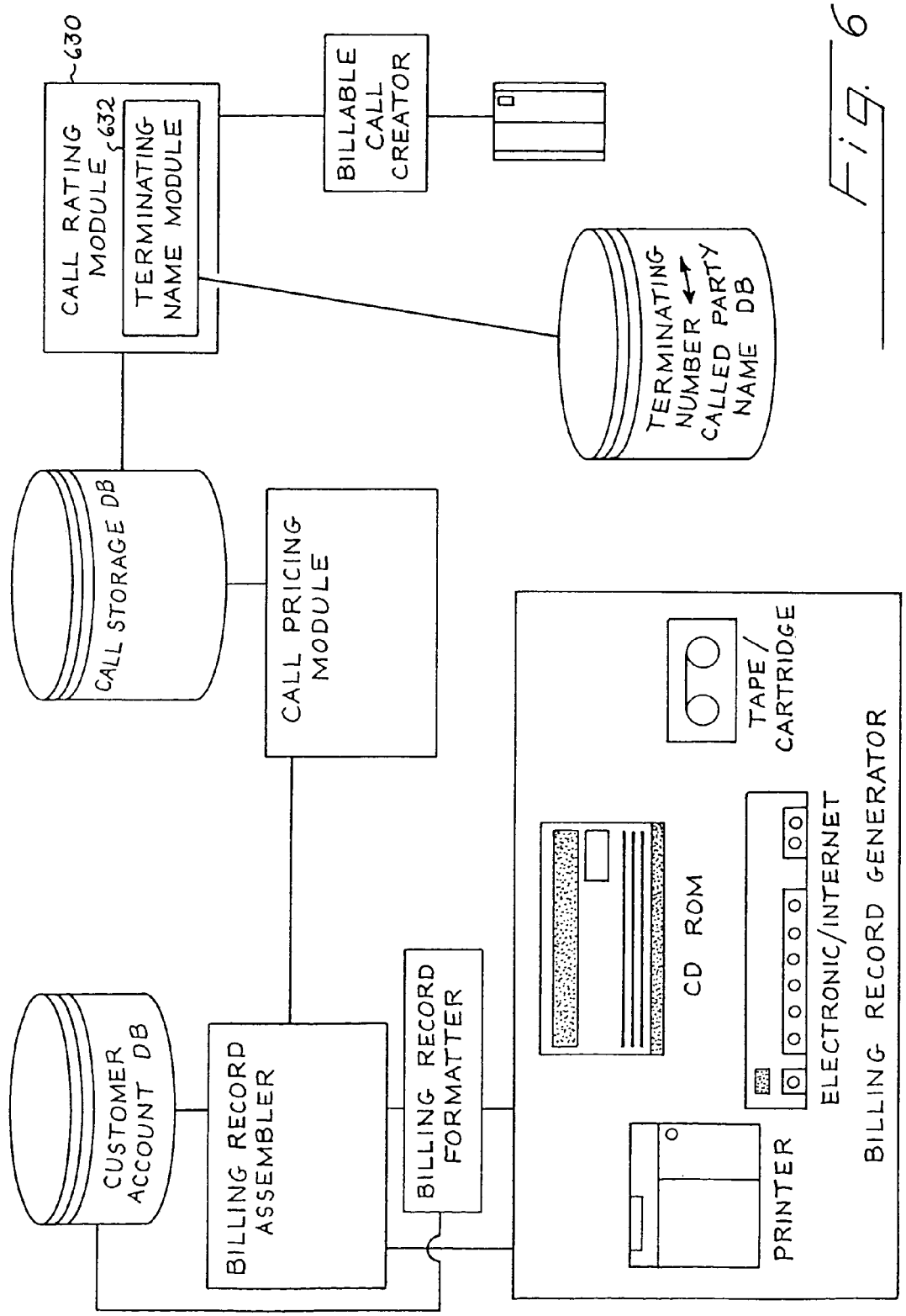
FIG. 6 is a block diagram of a system of another preferred embodiment for creating a billing record with a called party's name.
Figure 7:
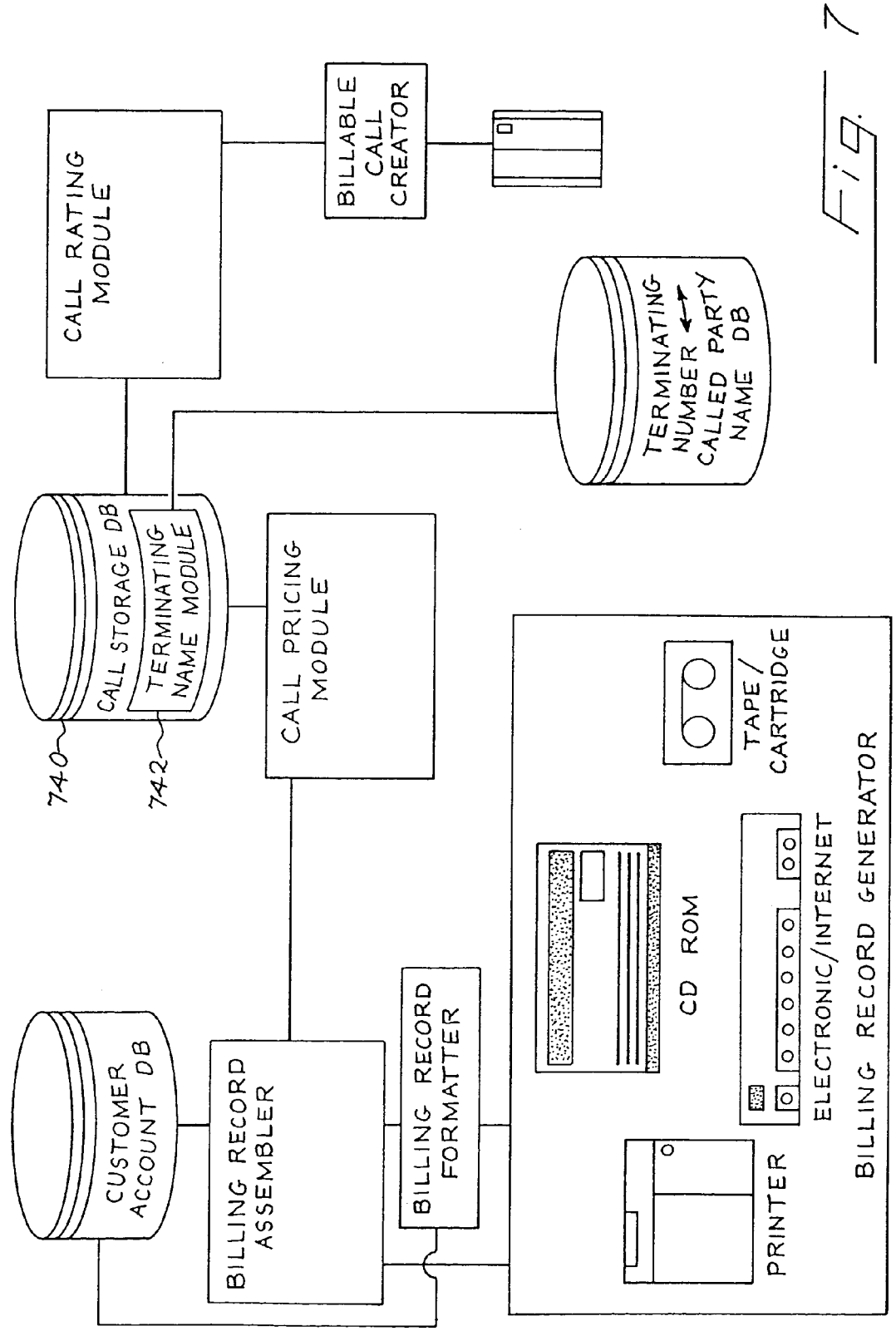
FIG. 7 is a block diagram of a system of another preferred embodiment for creating a billing record with a called party's name.

In the system 300 of FIG. 3, the terminating name module 362 is part of the billing record assembler 360. The terminating name module can, however, be implemented in other parts of the billing system, and the eligible terminating numbers can be extracted from the call record that is present in that part of the system. For example, FIG. 5 shows a billing system 500 in which the terminating name module 552 is part of the call pricing module 550. By being part of the call pricing module 550, the terminating name module 552 can extract eligible terminating numbers from the call record present in the call pricing module 550 and can query the terminating-number-to-called-party's-name database 554 to determine the called party's name during pricing when volume discounts, calling plans, and usage summaries are being calculated. In other alternatives, the terminating name module 632, 742 can be part of the call rating module 630 (as shown in FIG. 6) or the call storage database 740 (as shown in FIG. 7), and the eligible terminating numbers can be extracted from the call record in the call rating module 630 and call storage database 740, respectively. Since adding the called party's name to the call record may lengthen the call record, several components of the billing system may need to be modified accordingly. To introduce the least amount of intrusion into the billing system, it is preferred that the terminating name module be part of the billing record assembler, as shown in FIG. 3. Further, by being part of the billing record assembler, the terminating name module would be more response to those customers who activate or de-activate the service in the middle of a billing cycle (i.e., mid-month).

In the preferred embodiments described above, the call record was modified to include the called party name. To ensure that the call record is the same length before and after the modification, the called party's name can replace one of the fields (e.g., geographic location) already present in the call record. Alternatively, the called party's name can be added to the call record to create a more informative billing record. For example, providing the called party's name with the geographic location information can be particularly helpful when the called party's name is not available in the database or if the response from the database is inaccurate. Adding additional information to the call record may require altering some parts of the billing system to accepted the longer call record.

As described above, the terminating name module can select which terminating numbers are eligible for the called-party's-name-on-bill service, thereby making the billing system more efficient. For example, the terminating name module can exclude those numbers that are already identifiable to a phone user, such as those for directory assistance, voice-message services, information provider services (e.g., 900 and 976 services), and conference-call set-up calls. If a particular telephone company only has access to a national directory assistance database, international numbers can be excluded from the terminating name module. If a particular telephone company only has access to a national directory assistance database, it is preferred that only the call types shown in Table 1 be sent to the terminating name module.

TABLE 1

| | |
|---|---|
| 010101 | Message Telephone Service Charge |
| 010105 | 800 service (Recorded at Originating Location) |
| 010107 | Non-Dial Conference Leg |
| 010109 | Billable Conference Leg Charge |
| 011010 | Picture Phone Charge |
| 010112 | Person/Collect announcement Charge |
| 010125 | 800 Service |
| 010131 | Local |
| 010133 | Mobile Channel usage charge |

TABLE 1-continued

| | |
|---|---|
| 010134 | Messenger Service Charge |
| 010135 | Verification Service Charge |
| 010137 | Interrupt Service Charge |
| 010180 | Marine/Aircraft/High-Speed Train Toll Charge |
| 010181 | Marine/Aircraft/High-Speed Train Radio link Charge |
| 010182 | Marine Non-Dial Conference Leg |

The call types shown in Table 1 refer to call types described in the document "Bellcore Standard Exchange Message Records" (document Number BR 010-200-010). Of the call types listed in Table 1, it is preferred that only those calls with a settlement code number or a value of J in position 149 (the "settlement code" position) of the exchange message record be sent. It is preferred that the data used to query the database be the data stored in position 30–39 (the "to number"). If a value of 2 (collect) is stored in position 80 ("the call message type"), it is preferred that the data stored in position 15–24 (the "from number") be used. Position 15–24 (the "from number") is also preferably used for call types 010105 and 010125.

For simplicity, the terms "terminating name module", "billing record assembler", "call pricing module", "call rating module"., "billable call creator", and "billing record formatter" are used in the specification and claims to broadly refer to hardware and/or software that can be used to perform the functions described above. It is important to note that any appropriate software language and any appropriate hardware, analog or digital, now in existence or later developed, can be used. Examples of hardware that can be programmed to perform the above-described functions include IBM Series Numbers 9672 and 9021 and RISC-6000 systems. A computer-usable medium having computer readable program code embodied therein can be used to perform the functions described above, and the functions described above can alternatively be implemented exclusively with hardware. Additionally, the functionality associated with each element can be combined with or distributed to other elements. Also, some of the elements described above may not be needed in all embodiments.

It is intended that the foregoing detailed description be understood as an illustration of selected forms that the invention can take and not as a definition of the invention. It is only the following claims, including all equivalents, that are intended to define the scope of this invention.

What is claimed is:

1. A method for creating a billing record with a called party's name, the method comprising:
   (a) sending a call record from a switch to a billing system, wherein the call record comprises a plurality of terminating numbers;
   (b) with the billing system, identifying a called party's name associated with a terminating number from the call record;
   (c) with the billing system, adding the called party's name to the call record; and
   (d) with the billing system, creating a billing record from the call record, whereby the billing record comprises the called party's name.

2. The invention of claim 1, wherein the call record comprises at least one number that is not associated with an information provider service.

3. The invention of claim 1, wherein the switch comprises a public switch.

4. The invention of claim 1, wherein the called party's name is identified in (b) by querying a database with the terminating number.

5. The invention of claim 4, wherein the call record comprises a plurality of a given terminating number, and wherein the invention further comprises querying the database with a single occurrence of the given terminating number.

6. The invention of claim 1, wherein (b)–(d) are performed after call processing.

7. The invention of claim 1, wherein the switch is part of a telephone network, and wherein the billing system is separate from the telephone network.

8. A method for creating a billing record with a called party's name, the method comprising:
   (a) sending a call record from a switch to a billing system, wherein the call record comprises a plurality of terminating numbers; and
   (b) with the billing system:
      (b1) adding a called party's name to the call record; and
      (b2) creating a billing record from the call record, whereby the billing record comprises the called party's name.

9. The invention of claim 8, wherein (b) is performed after call processing.

10. The invention of claim 8, wherein the call record comprises at least one number that is not associated with an information provider service.

11. The invention of claim 8, wherein the switch comprises a public switch.

12. The invention of claim 8, wherein (b) further comprises identifying the called party's name by querying a database with a terminating number from the call record.

* * * * *